United States Patent
Kim et al.

(10) Patent No.: US 9,092,420 B2
(45) Date of Patent: Jul. 28, 2015

(54) APPARATUS AND METHOD FOR AUTOMATICALLY GENERATING GRAMMAR FOR USE IN PROCESSING NATURAL LANGUAGE

(75) Inventors: Jung-Eun Kim, Yongin-si (KR); Jeong-Mi Cho, Seongnam-si (KR); Jeong-Su Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/248,320

(22) Filed: Sep. 29, 2011

(65) Prior Publication Data

US 2012/0179454 A1    Jul. 12, 2012

(30) Foreign Application Priority Data

Jan. 11, 2011  (KR) ........................ 10-2011-0002822

(51) Int. Cl.
*G06F 17/27*    (2006.01)

(52) U.S. Cl.
CPC .................................... *G06F 17/274* (2013.01)

(58) Field of Classification Search
CPC ... G10L 15/183; G10L 15/193; G10L 15/065; G10L 15/19; G10L 15/20; G10L 15/04; G06F 17/3071; H04N 5/4403; H04N 5/44543; H04N 21/42203; H04N 21/42222
USPC .............. 704/231, 257, 9, 4, 277, 275, 270.1, 704/270, 251, 246, 240, 236, 234, 10; 709/227; 340/539.1, 12.54
See application file for complete search history.

(56) References Cited

U.S. PATENT DOCUMENTS

| | | | | |
|---|---|---|---|---|
| 5,752,232 A | * | 5/1998 | Basore et al. | 704/275 |
| 6,523,026 B1 | * | 2/2003 | Gillis | 1/1 |
| 6,668,256 B1 | * | 12/2003 | Lynch | 1/1 |
| 6,762,692 B1 | * | 7/2004 | Mingot et al. | 340/12.54 |
| 7,062,561 B1 | * | 6/2006 | Reisman | 709/227 |
| 7,254,530 B2 | * | 8/2007 | Klavans et al. | 704/10 |
| 7,925,505 B2 | * | 4/2011 | Wu | 704/236 |
| 8,374,875 B2 | * | 2/2013 | Genly | 704/270 |
| 2002/0065653 A1 | * | 5/2002 | Kriechbaum et al. | 704/231 |
| 2002/0087309 A1 | * | 7/2002 | Lee et al. | 704/240 |
| 2003/0074200 A1 | * | 4/2003 | Kuzunuki et al. | 704/270.1 |
| 2003/0105632 A1 | * | 6/2003 | Huitouze et al. | 704/246 |
| 2003/0144845 A1 | * | 7/2003 | Lee | 704/275 |
| 2004/0054530 A1 | * | 3/2004 | Davis et al. | 704/231 |
| 2004/0148170 A1 | * | 7/2004 | Acero et al. | 704/257 |
| 2004/0199394 A1 | * | 10/2004 | Kuzunuki et al. | 704/277 |
| 2004/0220944 A1 | * | 11/2004 | Behrens et al. | 707/100 |
| 2005/0043936 A1 | * | 2/2005 | Corston-Oliver et al. | 704/4 |
| 2005/0289124 A1 | * | 12/2005 | Kaiser et al. | 707/3 |
| 2006/0028337 A1 | * | 2/2006 | Li | 340/539.1 |
| 2006/0074671 A1 | * | 4/2006 | Farmaner et al. | 704/257 |
| 2006/0080101 A1 | * | 4/2006 | Chotimongkol et al. | 704/257 |
| 2007/0016401 A1 | * | 1/2007 | Ehsani et al. | 704/9 |
| 2007/0043562 A1 | * | 2/2007 | Holsinger et al. | 704/231 |

(Continued)

*Primary Examiner* — Michael Colucci
(74) *Attorney, Agent, or Firm* — NSIP Law

(57) ABSTRACT

Provided is an apparatus and method for automatically generating grammar for use in the processing of natural language. The apparatus may extract a corpus relevant to a target domain from a collection of corpora and may generate grammar for use in the target domain based on the extracted corpus. The apparatus may set one domain out of a plurality of domains as a target domain to be processed by an intention analysis system. The apparatus may extract a corpus relevant to the target domain from a collection of corpora and generate grammar based on the extracted corpus.

20 Claims, 3 Drawing Sheets

(56) References Cited

U.S. PATENT DOCUMENTS

| | | |
|---|---|---|
| 2007/0129935 A1* | 6/2007 | Uchimoto et al. ............... 704/9 |
| 2007/0239453 A1* | 10/2007 | Paek et al. .................... 704/257 |
| 2007/0288239 A1* | 12/2007 | Russell ......................... 704/257 |
| 2008/0004875 A1* | 1/2008 | Chengalvarayan et al. .. 704/234 |
| 2008/0162117 A1* | 7/2008 | Bangalore et al. ............. 704/10 |
| 2008/0270133 A1* | 10/2008 | Tian et al. .................... 704/251 |
| 2010/0057463 A1* | 3/2010 | Weng et al. ................... 704/257 |

\* cited by examiner

APPARATUS AND METHOD FOR AUTOMATICALLY GENERATING GRAMMAR FOR USE IN PROCESSING NATURAL LANGUAGE

CROSS-REFERENCE TO RELATED APPLICATION(S)

This application claims the benefit under 35 U.S.C. §119(a) of Korean Patent Application No. 10-2011-0002822, filed on Jan. 11, 2011, in the Korean Intellectual Property Office, the entire disclosure of which is incorporated herein by reference for all purposes.

BACKGROUND

1. Field

The following description relates to a technique that automatically generates grammar for use in the analysis of the intention of a user based on audio data or text that is input by the user.

2. Description of the Related Art

An increasing amount of attention has been drawn to techniques to search and/or manage information or control various devices using voice data and/or text data input by users. A device may determine or otherwise estimate the intention of the user by analyzing the input voice or text message, and may perform a particular operation based on the determination. For example, in response a user inputting a voice command or text message such as "Turn on the TV," a TV may analyze the input voice or text message, determine the intention of the user based on the analysis, and automatically turn on the TV according to the determination.

In order to analyze the intention of a user based on audio or text data input by the user, grammar is typically used (i.e. spoken words or written/typed words). For example, a user intention analysis device may use grammar such as audio or text data input by a user to analyze the intention of the user. A considerable amount of grammar may be necessary to handle a variety of vocabulary and expressions in an effort to perform a precise intention analysis. However, it is costly and time-consuming to generate an analysis device that can analyze a large amount of grammar, and there is a limit in properly creating grammar to reflect a variety of vocabulary and expressions.

SUMMARY

In one general aspect, there is provided an apparatus for automatically generating grammar for use in the processing of natural language, the apparatus including a setting unit configured to set one domain out of a plurality of domains as a target domain to be processed by an intention analysis system, a first extraction unit configured to extract a corpus relevant to the target domain from a collection of corpora, and a generation unit configured to generate a grammar based on the extracted corpus.

The apparatus may further comprise a classification unit configured to classify the extracted corpus into one or more domain actions that correspond to the target domain.

The domain actions may be categories of user intentions for inducing actions and/or responses from an intention analysis system.

The apparatus may further comprise a second extraction unit configured to extract one or more concepts from each of the domain actions, wherein the generation unit is further configured to generate the grammar based on the domain actions and the concepts that are extracted from each of the domain actions.

The apparatus may further comprise a removal unit configured to remove at least one of ungrammatical words or sentences from the extracted corpus.

The apparatus may further comprise a class conversion unit configured to convert one or more words included in the extracted corpus into classes.

The classes may comprise one or more of a word included in a corpus, a synonym of a word included in the corpus, and a category corresponding to a word in the corpus.

The collection of corpora may include text corpus that is collected from one or more of novels, magazines, dictionaries, and text available on the World Wide Web, and the collection of corpora may further include speech corpus that is collected from one or more of conversations, interviews, and speeches.

The first extraction unit may use vectors to represent the collection of corpora and a reference corpora, and the first extraction unit extracts the corpus relevant to the target domain based on a comparison of the vectors.

In another aspect, there is provided a method for automatically generating grammar for use in the processing of natural language, the method including setting one domain out of a plurality of domains as a target domain to be processed by an intention analysis system, extracting a corpus relevant to the target domain from a collection of corpora, and generating a grammar based on the extracted corpus.

The method may further comprise classifying the extracted corpus into one or more domain actions that correspond to the target domain.

The domain actions may be categories of user intentions for inducing actions and/or responses from an intention analysis system.

The method may further comprise extracting one or more concepts from each of the domain actions, wherein the generating the grammar comprises generating the grammar based on the domain actions and the concepts that are extracted from each of the domain actions.

The method may further comprise removing at least one of ungrammatical words or sentences from the extracted corpus.

The method may further comprise converting one or more words included in the extracted corpus into classes.

The classes may comprise one or more of a word included in a corpus, a synonym of a word included in the corpus, and a category corresponding to a word in the corpus.

The collection of corpora may include text corpus that is collected from one or more of novels, magazines, dictionaries, and text available on the World Wide Web, and the collection of corpora may further include speech corpus that is collected from one or more of conversations, interviews, and speeches.

The extracting the corpus may comprise using vectors to represent the collection of corpora and a reference corpora, and extracting the corpus relevant to the target domain based on a comparison of the vectors.

Other features and aspects may be apparent from the following detailed description, the drawings, and the claims.

Figure 1:
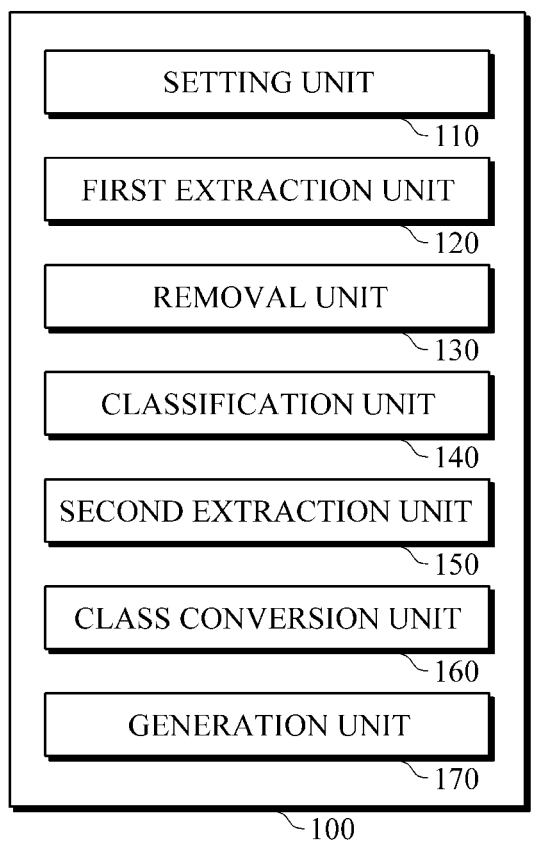
FIG. 1 is a diagram illustrating an example of an apparatus for automatically generating grammar for use in the processing of natural language.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for automatically generating grammar for use in the processing of natural language. The apparatus may be included in a terminal, for example, a computer, a mobile terminal, a smart phone, a camera, an MP3 player, a tablet, a home appliance, and the like.

Referring to FIG. 1, apparatus 100 includes a setting unit 110, a first extraction unit 120, a removal unit 130, a classification unit 140, a second extraction unit 150, a class conversion unit 160, and a generation unit 170.

Natural language processing is an artificial intelligence (AI) technique that may be used to understand, analyze, and/or create human language using an intention analysis system. For example, natural language may be created based on text, audio data, graphic data, and the like.

The setting unit 110 may set one domain from among a plurality of domains as a target domain to be processed by an intention analysis system. Examples of the domain types include a TV control domain, a video search domain, a personal information management system domain, and the like.

The first extraction unit 120 may extract a corpus that is relevant to the target domain from a collection of corpora. As described herein, a corpus is a collection of language data for use in language processing. For example, a corpus may include text corpus that is collected from novels, magazines, newspapers, dictionaries, usage instructions, text available on the web, and the like. As another example, a corpus may include a speech corpus that is obtained from the transcripts of conversations, interviews, speeches, and the like. The collection of corpora may be a database of a considerable number of corpora that are obtained from the internet, various text data, various audio data and the like. The collection of corpora may be updated periodically or aperiodically.

For example, if the target domain is a TV control domain, the first extraction unit 120 may extract a corpus that is relevant to the TV control domain from among the collection of corpora.

For example, the first extraction unit 120 may use vectors to represent the collection of corpora and a reference corpus. The first extraction unit 120 may extract the corpus relevant to the target domain by comparing the similarity between the vectors. The reference corpus may be used to determine whether a given corpus is a corpus that is relevant to the target domain. For example, the reference corpus may include extended words that are obtained using words relevant to the target domain and an ontology.

As another example, the first extraction unit 120 may determine whether one or more sentences of the collection of corpora include the words that are included in the reference corpus. It should be appreciated that the first extraction unit 120 may extract the corpus that is relevant to the target domain from among the collection of corpora based on the results of the determination using various methods other than those set forth herein.

The removal unit 130 may remove unnecessary words and/or sentences from the corpus extracted by the first extraction unit 120. For example, the removal unit 130 may remove words and/or sentences that are not grammatical or irrelevant to the target domain from the corpus extracted by the first extraction unit 120.

The classification unit 140 may classify the corpus that is provided by the removal unit 130 into one or more domain actions corresponding to the target domain. For example, the domain actions may be categories of user intentions for inducing certain actions or responses from an intention analysis system. The domain actions may differ from one domain to another domain.

As a non-exhaustive example, in a case in which the target domain is the TV control domain, a corpora relevant to the TV control domain may be classified into 'SetChannel,' 'GetProgram,' 'GetNextProgram,' and 'SetVolume' domain actions. The classification unit 140 may classify the corpus provided by the removal unit 130 into one or more domain actions corresponding to the target domain. For example, the classification unit 140 may use a support-vector machine (SVM) technique, a Classification and Regression Trees (CART) technique, a Sparse Network of Windows (SNoW) technique, and the like, to classify the corpus into domain actions.

The second extraction unit 150 may extract one or more concepts from each domain action classified by the classification unit 140. For example, the concepts may be parameters that are used for completing each domain action, i.e., the intention of each sentence. For example, the second extraction unit 150 may extract a word 'channel' as a concept from the domain action 'SetChannel.'

The class conversion unit 160 may convert one or more words from each of the domain actions into classes. For example, a class may include a word included in a corpus, a synonym of the word, a category corresponding to the word, and the like. As an example, the class conversion unit 160 may convert an imperative that ends with 'ra' of a Korean word 'teuora' into an 'imperative ending' class including the imperative ending 'ra' and other imperative endings. The class conversion unit 160 may convert a noun phrase or an adverb phrase into a noun phrase class or an adverb phrase class.

As another example, the class conversion unit 160 may convert a word 'December' into a 'date' class, a word 'sports' into a 'genre' class, a word 'CNN' into a 'channel' class, and the imperative ending 'ra' into the 'imperative ending' class, thereby expanding each word to a class.

The generation unit 170 may generate grammar for use in the target domain, based on the domain actions provided by the classification unit 140 and the concepts extracted from the corresponding domain actions by the second extraction unit 150. For example, the generated grammar may be a set of rules for determining the intention of a user based on audio and/or text data that is input by the user. The generation of the grammar for use in the processing of a natural language by the apparatus 100 is further described with reference to FIG. 2.

In various aspects, the apparatus 100 may extract a corpus that is relevant to a target domain from a collection of corpora, and may automatically generate grammar based on the extracted corpus, thereby facilitating the generation of a grammar for use in the target domain. Although not shown in FIG. 1, the apparatus 100 may include a storage for storing the plurality of domains, the collection of corpora, the domain actions, the classes, and the like.

Figure 2:
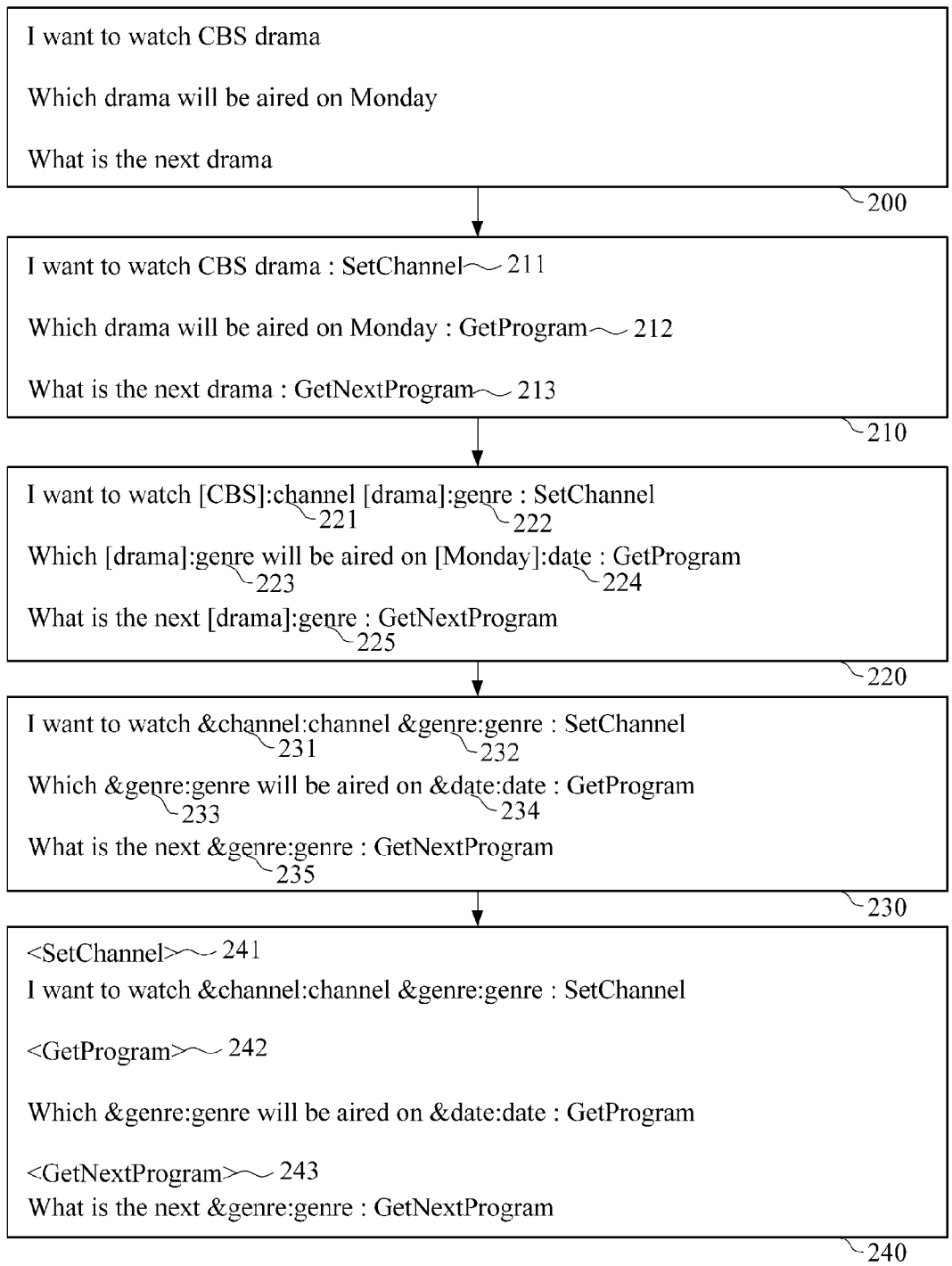
FIG. 2 is a diagram illustrating an example of a process for generating grammar for use in the processing of natural language.

FIG. 2 illustrates an example of generating grammar for use in the processing of natural language. For example, the grammar may be generated by the apparatus 100 that is illustrated in FIG. 1.

Referring to FIGS. 1 and 2, a TV control domain is set as a target domain by the setting unit 110. The first extraction unit 120 may extract a corpus 200 that is relevant to the TV control domain from a collection of corpora. The first extraction unit 120 may divide the corpus 200 into a plurality of sentences, and may tag each sentence on a morpheme-by-morpheme basis.

The removal unit 130 may remove one or more ungrammatical words and/or sentences from the corpus 200.

The classification unit 140 may classify the corpus 200 into a plurality of domain actions that correspond to the TV control domain. For example, the classification unit 140 may classify a first sentence of the corpus 200 into a 'SetChannel' domain action 211 for selecting a channel, a second sentence of the corpus 200 into a 'GetProgram' domain action 212 for acquiring general program information, and a third sentence of the corpus 200 into a 'GetNextProgram' action domain 213 for acquiring next program information.

The second extraction unit 150 may extract one or more concepts from each of the domain actions that are provided by the classification unit 140. For example, the second extraction unit 150 may extract the words 'CBS' and 'drama' from the 'SetChannel' domain action 211 as a 'channel' concept 221 and a 'genre' concept 222, respectively. As another example, the second extraction unit 150 may extract the words 'drama' and 'Monday' from the 'GetProgram' domain action 212 as a 'genre' concept 223 and a 'date' concept 224. As another example, the second extraction unit 150 may extract the word 'next' from the 'GetNextProgram' domain action 213 as a 'genre' concept 225.

The class conversion unit 160 may convert one or more words in each of the domain actions into classes. In this example, each of the classes is marked with a symbol '&' to be easily distinguished. For example, the class conversion unit 160 may convert the words 'CBS' and 'drama' in the 'SetChannel' domain action 211 into a '&channel' class 231 and a '&genre' class 232, respectively. As another example, the class conversion unit 160 may convert the words 'drama' and 'Monday in the 'GetProgram' domain action 212 into a '&genre' class 233 and a '&date' class 234, respectively. As another example, the class conversion unit 160 may convert the word 'drama' in the 'GetNextProgram' domain action 213 into a '&genre' class 235.

The generation unit 170 may generate grammar for use in the target domain. For example, the grammar may be generated based on the domain actions provided by the classification unit 140, the concepts extracted from the corresponding domain actions by the second extraction unit 150, and a set of grammar generation rules. As an example, the set of grammar generation rules may include a set of rules for inserting one or more operators indicating the spaces between words and whether there are words that can be omitted.

In the example of FIG. 2, the generation unit 170 may generate grammar 241 for the 'SetChannel' domain action 211 by displaying the concepts in the 'SetChannel' domain action 211 distinguishably and inserting one or more operators between the words in the 'SetChannel' domain action 211. The generation unit 170 may also generate grammar 242 and 243 for the 'GetProgram' and 'GetNextProgram' domain actions 212 and 213, respectively, using the same method that is used to generate the grammar 241.

Figure 3:
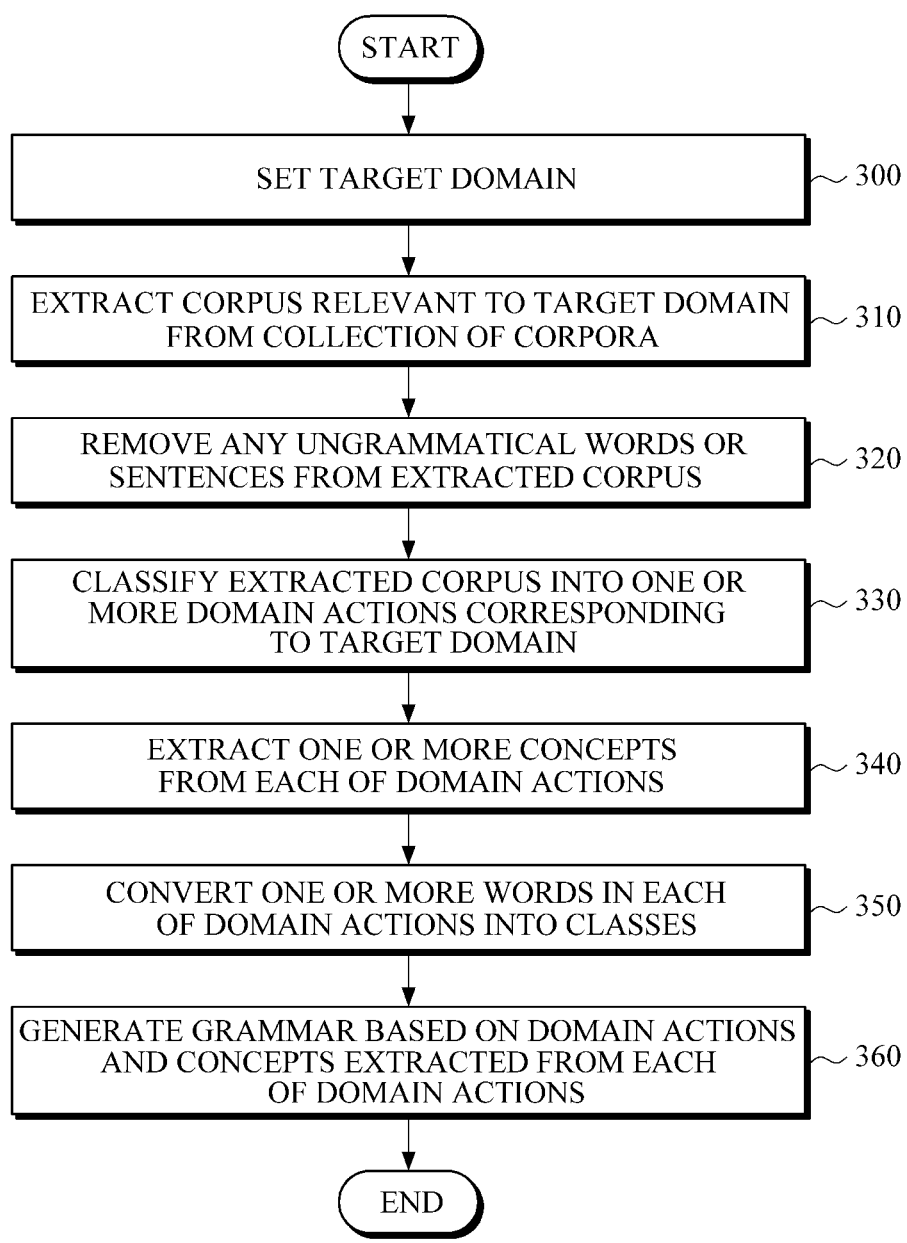
FIG. 3 is a flowchart illustrating an example of a method for automatically generating grammar for use in the processing of natural language.

FIG. 3 illustrates an example of a method for automatically generating grammar for use in the processing of natural language.

Referring to FIG. 3, in 300, one of a plurality of domains is set as a target domain that is to be processed by an intention analysis system. In 310, an apparatus for automatically generating grammar for use in the processing of a natural language extracts a corpus that is relevant to the target domain from a collection of corpora.

In 320, the apparatus removes any ungrammatical words and/or sentences from the extracted corpus. In 330, the apparatus classifies the extracted corpus into a plurality of domain actions. In 340, the apparatus extracts one or more concepts from each of the domain actions.

In 350, the apparatus converts one or more words in each of the domain actions into classes. In 360, the apparatus generates grammar for use in the target domain for each of the domain actions, based on the concepts extracted from each of the domain actions.

As described herein, it is possible to automatically generate grammar for use in a target domain by extracting a corpus that is relevant to the target domain from among a collection of corpora.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/portable device/communication unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for automatically generating grammar for use in the processing of natural language, the apparatus comprising:
    a setting processor configured to set one domain as a target domain to be processed by an intention analysis system;
    a first extractor configured to extract a corpus relevant to the target domain from a collection of corpora and divide the corpus into sentences and tag the sentences;
    a classification unit configured to classify the extracted corpus into a domain action among one or more domain actions that correspond to the target domain;
    a class converter configured to convert one or more words included in the extracted corpus into classes; and
    a generator configured to generate a grammar based on the converted classes of the extracted corpus wherein one or more ungrammatical words or sentences are removed from the corpus.

2. The apparatus of claim 1, wherein the domain actions are categories of user intentions for inducing actions and/or responses from an intention analysis system.

3. The apparatus of claim 1, further comprising a second extractor configured to extract one or more concepts from each of the domain actions,
    wherein the generator is further configured to generate the grammar based on the domain actions and the concepts that are extracted from each of the domain actions.

4. The apparatus of claim 1, further comprising a removal unit configured to remove at least one of ungrammatical words or sentences from the extracted corpus.

5. The apparatus of claim 1, wherein the classes comprise one or more of a word included in a corpus, a synonym of a word included in the corpus, and a category corresponding to a word in the corpus.

6. The apparatus of claim 1, wherein the collection of corpora include text corpus that is collected from one or more of novels, magazines, dictionaries, and text available on the World Wide Web, and the collection of corpora further includes speech corpus that is collected from one or more of conversations, interviews, and speeches.

7. The apparatus of claim 1, wherein the first extraction unit uses vectors to represent the collection of corpora and a reference corpora, and the first extraction unit extracts the corpus relevant to the target domain based on a comparison of the vectors.

8. The apparatus of claim 1, wherein the generated grammar is configured to be used by the apparatus for recognizing an intended command by a user for operating the apparatus.

9. The apparatus of claim 1, wherein the collection of corpora are updated periodically or aperiodically.

10. The apparatus of claim 1, wherein the target domain comprises TV control and the one or more actions comprise setting a channel, getting a program, or getting a next program.

11. The apparatus of claim 1, further comprising a classification unit configured to classify the extracted corpus into one or more domain actions that correspond to the target domain.

12. A method for automatically generating grammar for use in the processing of natural language, the method comprising:
    setting one domain as a target domain to be processed by an intention analysis system using a setting processor;
    extracting a corpus relevant to the target domain from a collection of corpora using an extractor, dividing the corpus into sentences and tagging the sentences;
    classifying the extracted corpus into a domain action among one or more domain actions that correspond to the target domain;
    converting one or more words included in the extracted corpus into classes; and
    generating a grammar based on the converted classes of the extracted corpus using a generator wherein one or more ungrammatical words or sentences are removed from the corpus.

13. The method of claim 12, wherein the domain actions are categories of user intentions for inducing actions and/or responses from an intention analysis system.

14. The method of claim 12, further comprising extracting one or more concepts from each of the domain actions,
    wherein the generating the grammar comprises generating the grammar based on the domain actions and the concepts that are extracted from each of the domain actions.

15. The method of claim 12, further comprising removing at least one of ungrammatical words or sentences from the extracted corpus.

16. The method of claim 12, wherein the classes comprise one or more of a word included in a corpus, a synonym of a word included in the corpus, and a category corresponding to a word in the corpus.

17. The method of claim 12, wherein the collection of corpora include text corpus that is collected from one or more of novels, magazines, dictionaries, and text available on the World Wide Web, and the collection of corpora further includes speech corpus that is collected from one or more of conversations, interviews, and speeches.

18. The method of claim 12, wherein extracting the corpus comprises using vectors to represent the collection of corpora and a reference corpora, and extracting the corpus relevant to the target domain based on a comparison of the vectors.

19. The method of claim 12, further comprising classifying the extracted corpus into one or more domain actions that correspond to the target domain.

20. A non-transitory computer-readable storage medium having stored therein program instructions to cause a processor to execute a method for automatically generating grammar for use in the processing of natural language, the method comprising:
- setting one domain as a target domain to be processed by an intention analysis system;
- extracting a corpus relevant to the target domain from a collection of corpora, dividing the corpus into sentences and tagging the sentences;
- classifying the extracted corpus into a domain action among one or more domain actions that correspond to the target domain;
- converting one or more words included in the extracted corpus into classes; and
- generating a grammar based on the converted classes of the extracted corpus wherein one or more ungrammatical words or sentences are removed from the corpus.

* * * * *